United States Patent [19]
Horton

[11] 4,010,975
[45] Mar. 8, 1977

[54] AUXILIARY FOOTREST FOR AUTOMOBILES

[76] Inventor: Frank Horton, 302 Broadway, Lamar, Mo. 64759

[22] Filed: Nov. 21, 1975

[21] Appl. No.: 634,265

[52] U.S. Cl. .................................... 296/75; 74/564
[51] Int. Cl.² .......................................... B60N 3/06
[58] Field of Search .......... 296/75; 180/90.6, 77 R, 180/1 R; 74/564

[56] References Cited

UNITED STATES PATENTS

| | | | |
|---|---|---|---|
| 1,554,969 | 9/1925 | Henke | 180/90.6 |
| 1,893,681 | 1/1933 | Rabbes | 74/564 |
| 1,981,148 | 11/1934 | Muench | 74/564 |
| 3,059,715 | 10/1962 | Lopez | 180/77 R |
| 3,784,247 | 1/1974 | Mills | 296/75 |

FOREIGN PATENTS OR APPLICATIONS 1,260,784   4/1961   France ................................ 180/1 R Primary Examiner—Robert R. Song
Assistant Examiner—Milton L. Smith
Attorney, Agent, or Firm—John A. Hamilton

[57] ABSTRACT

An auxiliary footrest for automobiles consisting of a step rigidly affixed to the automobile body directly adjacent and to the right of the accelerator pedal, at an elevation higher than the normal elevation of the pedal, and adapted to support the right foot of the driver when it is not on the pedal, as is often necessary in cars equipped with automatic speed regulating devices. A skirt attached to the step edge adjacent the accelerator pedal and depending below said pedal may be used as a guide to direct the driver's foot to and from the footrest.

6 Claims, 4 Drawing Figures

U.S. Patent    Mar. 8, 1977    4,010,975
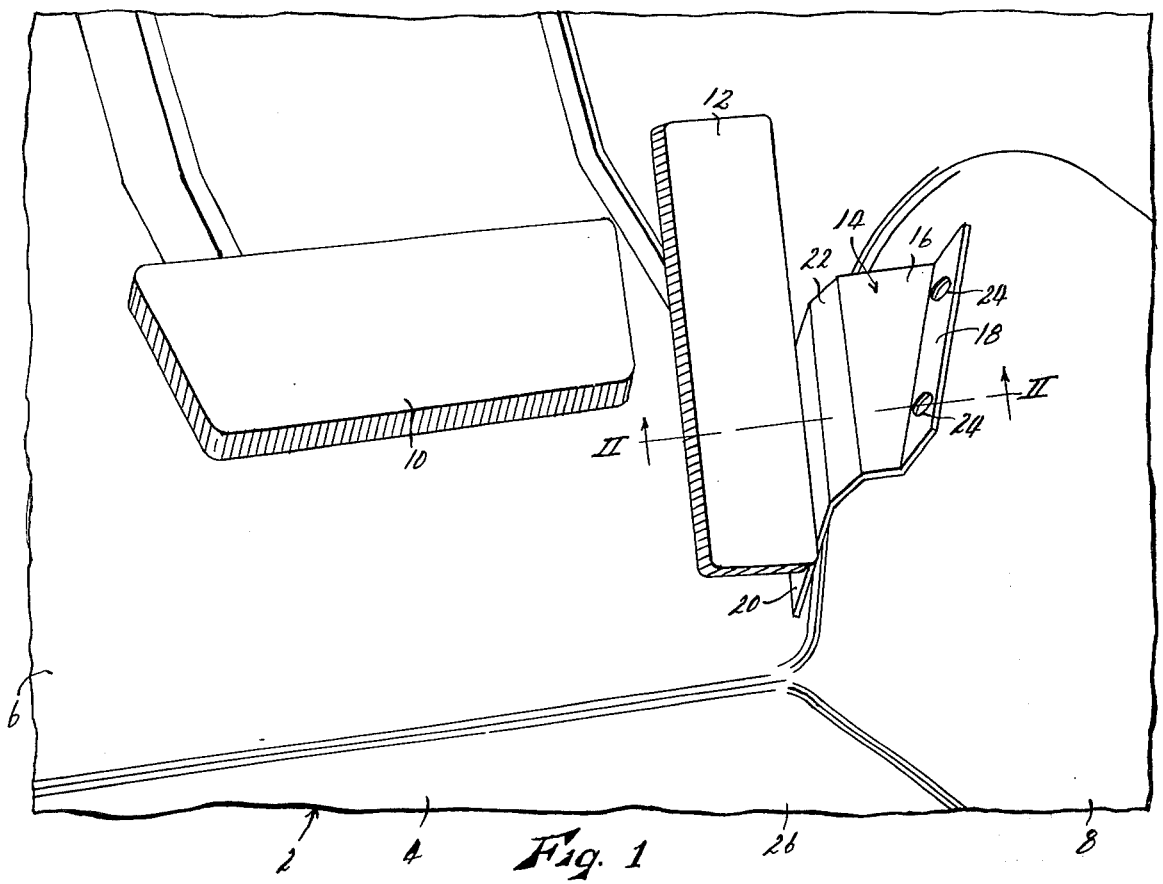
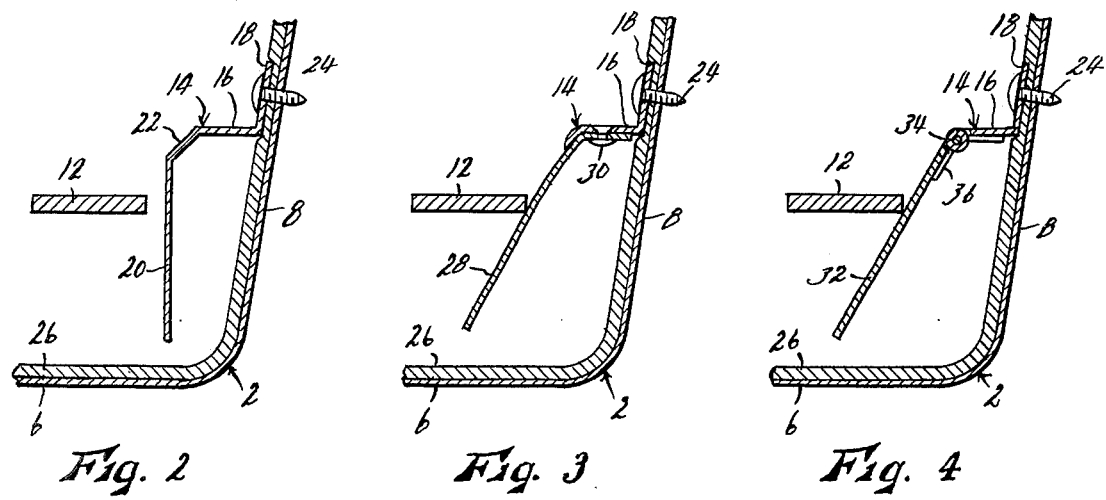

AUXILIARY FOOTREST FOR AUTOMOBILES

This invention relates to new and useful improvements in automobile accessories, and has particular reference to an auxiliary footrest operable to support the right foot of the driver when said foot is not and cannot be rested on the pedal itself.

Many modern automobiles are equipped with automatic speed regulating devices commonly known as "cruise controls", "automatic pilots," and the like. While the details of such systems are not pertinent to the present invention, their general concept of operation is that they provide means whereby when the speed of the automobile is preset at any desired level, the device wll thereafter maintain the car at that speed despite any uphill or downhill grades or curves that may be encountered. Of course, it must be possible to slow and stop the vehicle whenever required, and for this purpose all such systems within my knowledge are so arranged that a mere touch of the foot on the brake pedal will switch the automatic control out of operation, to be switched back into operation by some manual action of the driver when continued sustained speed at the controlled level is again safely permissable. In most such systems, further depression of the accelerator pedal will increase the car speed, overriding the regulating control, and the speed will again return to the lower controlled level when the foot is removed from the pedal.

However, while the details of operation of such "cruise control" systems are not pertinent to the present invention, their use gives rise to the problem, faced by the driver, of "what to do with" his right foot while the system is in operation. He cannot of course rest it on the brake pedal, as this would deactivate the cruise control, nor on the accelerator pedal, as this would override the cruise control. Also the "transmission hump" of the floorboards to the right of the accelerator pedal is usually far too high to constitute a comfortable foot rest. As a result, most drivers under these circumstances rest their right feet on the floorboards to the left of the accelerator pedal, so that their feet are disposed under the brake pedal, which of course is immediately to the left of the accelerator. Not only is this position not comfortable for many drivers, but also it is not a safe practice, since if the driver should encounter emergency conditions requiring either rapid deceleration by pressure on the brake pedal, or rapid acceleration by pressure on the accelerator pedal, his foot may be caught beneath the brake pedal, or between the brake and accelerator pedals, which normally are quite closely spaced, as he attempts to raise his foot to apply pressure to one pedal or the other. Delays occasioned by such occurrences are not likely to be lengthy, but even very short delays under many emergency conditions can be disastrous or fatal.

Accordingly, the primary object of the present invention is the provision of a footrest adapted to be positioned adjacent the accelerator pedal of an automobile equipped with an automatic speed regulating device, and so positioned as to provide a comfortable rest for the driver's right foot whenever said foot cannot be rested on said accelerator pedal, while at the same time maintaining his foot in a position permitting instant movement of his foot to either pedal with no danger of said movement being interfered with or slowed by said pedals.

Another object is the provision of a footrest of the character described provided additionally with guard means preventing the footrest itself from obstructing movement of the driver's foot, such as movement from the accelerator pedal to the footrest, or to the brake pedal. Particularly the latter of these movements must often be accomplished with great rapidity in emergency conditions.

Other objects are extreme simplicity and economy of construction, and efficiency and dependability of operation.

With these objects in view, as well as other objects which will appear in the course of the specification, reference will be had to the accompanying drawing, wherein:

FIG. 1 is a fragmentary perspective view of the brake and accelerator pedals and related elements of an automobile, showing an auxiliary footrest embodying the present invention mounted in operative relationship thereto, FIG. 2 is a fragmentary sectional view taken on line II—II of FIG. 1, FIG. 3 is a view similar to FIG. 2, showing a slight modification of structure, and FIG. 4 is a view similar to FIG. 2, showing another modification of structure.

Like reference numerals apply to similar parts throughout the several views, and the numeral 2 applies generally to an automobile body, shown fragmentarily, the parts thereof actually shown including the floor 4 forwardly of the driver's seat, which is essentially horizontal except that the forward portion 6 is angled upwardly and forwardly to form a sloping "pedal board," and that the central portion thereof, along the midline of the vehicle, is offset upwardly to form a "hump" 8 which houses the engine transmission of the vehicle, said hump merging at its forward end with pedal board 6. The usual brake pedal 10 is disposed conveniently to the right foot of the driver, having the usual function of applying the vehicle brakes when pressure is applied, and, in an automobile equipped with the automatic speed regulating system commonly known as cruise control, the additional function of deactivating the cruise control when depressed to a very slight degree, before the brakes are applied. The usual accelerator pedal 12, also disposed conveniently to the right foot of the driver, and to the right of brake pedal 10, has the common function of controlling the engine to increase the vehicle speed when depressed. In automobiles equipped with cruise control, it has the additional function of overriding the cruise control to produce a higher vehicle speed if depressed by the driver while the cruise control is activated.

The auxiliary footrest forming the immediate subject matter of the present invention is indicated generally by the numeral 14. In the form thereof shown in FIGS. 1 and 2, said footrest comprises a unitary form of sheet metal configurated to form a planar step 16, flange 18, apron 20, and an inclined portion 22 interconnecting step 16 and apron 20. Step 16 is disposed somewhat above the normal elevated position of accelerator pedal 12, its plane being generally parallel to the plane of said pedal, and is rigidly mounted relative to the car body in any suitable manner, for example by affixing flange 18 thereof to hump 8 of floor 6 by means of sheet metal screws 24, which of course may also pierce the carpet mat 26 with which the hump is ordinarily covered. The hump is ordinarily so disposed relative to the accelerator pedal so as to render it a convenient point of attachment. Both the step 16 and its flange 18 may be specially configured, if necessary, to conform to the contour of hump 8. Also, the shape and extent of step 16 could be made adjustable, if desired, to bring it to the desired attitude and spacing relative to the accelerator pedal.

The step is disposed above and to the right of the normal elevated position of the accelerator pedal, as shown and described, its left edge being generally parallel to but spaced apart to the right of the right edge of the accelerator pedal, as shown. Apron 20 is disposed in a generally vertical plane, depending from the left edge of step 16, with sloping portion 22 interposed between the step and the apron, past the right edge of the accelerator pedal, completely out of engagement with said pedal at all positions of said pedal. However, the apron extends close enough to pedal board 6 that the operator's right foot on the accelerator pedal, even when said pedal is fully depressed, will still be engaged by said apron and prevented from sliding to the right on the pedal.

The operation of the auxiliary footrest as thus far described is believed obvious. Step 16 forms a convenient rest for the right foot of the driver whenever the activation of the cruise control system dictates that he cannot rest said foot on either the accelerator or brake pedals. At the same time, his foot is supported in such a position that he may transfer it with great rapidity to either of said pedals, the requirement for fast operation of either pedal being possible in various types of emergency conditions. Also, if the driver is at a particular moment driving with his right foot on the accelerator pedal, as for example either when the cruise control system is deactivated or when he is "overriding" the cruise control system by further depression of the pedal to produce a greater speed, emergency conditions may arise requiring rapid transfer of his foot, particularly to the brake pedal. If this situation arises, apron 20 positively prevents his foot from being caught, even momentarily, between the accelerator pedal and the lower surface of step 16. This catching of the foot cannot be permitted, even momentarily, since even split-second delays can sometimes have disastrous consequences. It could occur in the absence of apron 20, but is positively prevented by the presence of said apron. The sloping portion 22 of the footrest interconnecting step 16 and apron 20 guides and facilitates the movement of the driver's foot to and from the step.

The spacing of apron 20 from the right edge of accelerator pedal 12 must of course be sufficiently small to prevent the entry of the driver's foot, even the narrowest of feet, therebetween. On the other hand, many drivers habitually shift their right feet to the right, relative to the pedal, even to the extent of resting the right edge of the foot against hump 8 of the car floor. For such drivers, the form of the footrest shown in FIGS. 1 and 2 may be uncomfortable and restrictive, since it positively prevents any right movement of the foot on the pedal. Variations of the footrest shown in FIGS. 3 and 4 are designed to alleviate this source of annoyance. In FIG. 3, it will be seen that in place of apron 20, which is integral with step 16, there is substituted an apron 28 constituting a sheet of spring metal, which may be similar in area and form to apron 20, secured along its upper edge to the lower side of step 16 by any suitable means, such as rivets 3 (one shown). Said spring apron depends downwardly and to the left from the left edge of the step, and is biased to engage the right edge of accelerator pedal 12, as shown. In FIG. 4, a flap 32, which also may be similar in extent and form to apron 20, and which in itself may be rigid or essentially so, is substituted for apron 20, being pivoted along its upper edge to the left edge of step 16, as by means of a hinge 34, and extending downwardly to the left, being biased pivotally to the left to engage the right edge of accelerator pedal 12 by means of a clock spring 36 mounted in hinge 34. In both FIGS. 3 and 4, it will be understood that the substituted aprons 28 and 32 are urged against the right edge of accelerator pedal 12, whether by its own resilience in the case of apron 28, or by clock spring 36 in the case of apron 32, with a sufficiently small force, and at a sufficiently acute angle, that they do not interfere appreciably with the normal movement of said accelerator pedal.

In the operation of both the FIG. 3 and the FIG. 4 species, it will be seen that the yieldability of aprons 28 and 32 to the right, against the resilient force biasing them to the left, permits the driver to shift his foot to the right relative to the pedal, thereby allowing it to assume its habitual, comfortable position relative to said pedal. Nevertheless, when the driver removes his foot from the accelerator pedal, even if his foot is at that time disposed directly beneath step 16, his foot will be guided to the left as he raises it, so that it will not catch the underside of the step, by said aprons, the left faces of which will at that time be sloped upwardly to the left. As said aprons are pivoted to the right by the driver's foot, as described above, it will be seen that the engagement of their lower edges with either pedal board 6 or hump 8 will so limit the apron movement as to prevent positively movement thereof to any so nearly horizontal position, extending to the right of the left edge of step 16, that they could interfere in any way with the upward movement of the driver's foot from the accelerator pedal. In the absence of hump 8, or if the apron were so limited as not to engage pedal board 6, an auxiliary positive stop limiting the rightward movement of the aprons in this manner could be provided.

While I have shown and described certain specific embodiments of my invention, it will be readily apparent that many other minor changes of structure and operation could be made without departing from the spirit of the invention.

What I claim as new and desire to protect by Letters Patent is:

1. In combination with an automobile equipped with the usual accelerator pedal and the usual brake pedal disposed to the left of said accelerator pedal, both pedals being operable by the right foot of the driver, said automobile being equipped with an automatic speed regulating system commonly known as a cruise control system operable when activated to maintain the automobile at a pre-set speed, said cruise control system when activated requiring that the driver's right foot be removed from both of said pedals, an auxiliary footrest for the right foot of the driver, said footrest comprising:

a. a generally planar rigid step,
  b. means at the right edge of the step connecting said step rigidly to the body of said automobile and positioning said step with its plane generally parallel to and above the plane of said accelerator pedal when said pedal is in its normal raised position, and immediately to the right of said accelerator pedal, and c. a generally planar apron secured along its upper edge to the left edge of said step and extending generally vertically downwardly therefrom past and below the right edge of said accelerator pedal to a point at least as low as the upper surface of said pedal when said pedal is in its fully depressed position, the apron being secured only to the left edge of the generally planar step.

2. An auxiliary footrest as recited in claim 1 wherein said apron is rigid and is rigidly connected to said step, and is spaced apart to the right from the right edge of said accelerator pedal at all positions of said pedal.

3. An auxiliary footrest as recited in claim 1 wherein the upper edge of said apron is effectively pivoted to said step for movement laterally of said automobile, and with the addition of resilient means biasing said apron yieldably to the left into wiping contact with the right edge of said accelerator pedal.

4. An auxiliary footrest as recited in claim 3 with the addition of stop means operable to limit the pivotal movement of said apron to the right.

5. An auxiliary footrest as recited in claim 3 wherein said apron constitutes a sheet of resilient material affixed along its upper edge to said step, its resilience biasing the portions thereof below said step to the left to engage said accelerator pedal.

6. An auxiliary footrest as recited in claim 3 wherein said apron constitutes a generally planar sheet of substantially rigid material freely hinged along its upper edge to said step, and with the addition of spring means biasing said apron to the left to engage said accelerator pedal.

* * * * *